United States Patent [19]

Grooman

[11] 4,057,359
[45] Nov. 8, 1977

[54] BALLISTIC NYLON FABRIC TURBINE GOVERNOR HOUSING SHIELDING MEANS

[75] Inventor: Edward D. Grooman, Walnut Creek, Calif.

[73] Assignee: Chevron Research Company, San Francisco, Calif.

[21] Appl. No.: 643,607

[22] Filed: Dec. 22, 1975

[51] Int. Cl.² .............................................. B23B 39/04
[52] U.S. Cl. ................................... 415/9; 415/219 R; 428/35; 428/458; 428/474; 428/911
[58] Field of Search ................ 428/35, 458, 474, 911; 2/2.5; 415/9

[56] References Cited

U.S. PATENT DOCUMENTS

| | | | |
|---|---|---|---|
| 3,320,619 | 5/1967 | Lastnik et al. | 2/2.5 |
| 3,491,847 | 1/1970 | Abbott | 74/608 |
| 3,528,877 | 9/1970 | Scharf | 428/458 |
| 3,602,602 | 8/1971 | Motta | 415/9 |
| 3,733,213 | 5/1973 | Jacob | 428/458 |
| 3,783,449 | 1/1974 | Davis | 428/911 |
| 3,832,265 | 8/1974 | Denommee | 2/2.5 |
| 3,855,632 | 12/1974 | Davis | 2/2.5 |
| 3,924,038 | 12/1975 | McArdle et al. | 2/2.5 |

*Primary Examiner*—William R. Dixon, Jr.
*Attorney, Agent, or Firm*—J. A. Buchanan, Jr.; R. L. Freeland, Jr.

[57] ABSTRACT

A shielding means which has a continuous sidewall made up of a first set of multiple layers of ballistic nylon. An open end of the sidewall is closed with a second set of multiple layers of ballastic nylon. The other open end of the sidewall fits over and is securable to a housing cover to be shielded.

4 Claims, 5 Drawing Figures

BALLISTIC NYLON FABRIC TURBINE GOVERNOR HOUSING SHIELDING MEANS

BACKGROUND OF THE INVENTION

1. Field of the Invention

This invention relates to a protective cover for retaining flying fragments that may penetrate housing covers for turbine governor fly weights or similar rotary devices.

2. Description of the Prior Art

It is well known that turbine generators have high-speed governor fly weights which for one reason or another may fail and cause fragments of flying metal to penetrate their covers. This is especially true in situations where the housing covers are aluminum. Presently, there are flexible covers for rotary components of high-speed vehicles such as transmissions and bell housings. However, due to the nature and configurations of such components, their shields are open-ended.

Furthermore, metal shields have been disclosed which surround a turbine wheel. These shields force broken sections of the turbine wheel that fracture in a predetermined manner, against adjacent blades, which in turn fractures them, causing the speed of the turbine blade to reduce and eventually stop the blade. The reason, obviously, is that there are no blades which can receive an impulse from the gas or liquid flowing against them so as to cause their rotation. There has also been disclosed a housing cover which fits around the turbine blades that can catch broken portions of the turbine blade. This cover may also include a light metal coating, which when heated up will hold flying objects that strike it so that they do not get tossed back into the decomposing flywheel where they will be ground up. These shields are expensive and due to their weight are difficult to install.

The prior art does not disclose a lightweight, flexible and removable shield insertable over a turbine governor housing that does not (or suspected not to) perform as designed. One example is an aluminum housing cover that is easily penetrated by high-velocity fragments. The inventor has personal knowledge that a machine operator has been severely injured by such fragments which have penetrated an aluminum housing cover. Further, it is also possible that equipment reachable by the high-speed fragments may also be damaged.

Thus, in the interest of personnel and equipment safety, it is desirable to use my invention over existing housing covers as additional protection. My invention is a shield that cannot be penetrated by flying fragments. Also, it is flexible and may be conveniently folded and placed, for example, in a worker's pocket as well as easily installed and removed.

SUMMARY OF THE INVENTION

In accordance with my invention, a ballistic nylon shielding means is disclosed which has a tensile strength of approximately 430,000 psi, a modulus of elasticity $19 \times 10^6$ psi and an elongation at break of 2.3%. This material or fabric is treated with aluminum coating or aluminized so that it may be easily stitched with nylon thread. The shielding means has a continuous sidewall made up of several layers of ballistic nylon fabric and a closed-end wall also formed of several layers of nylon fabric. The closed-end wall may have a penetration to permit passage of operating linkage. The other end of the cover, which is open, fits over the turbine housing and is held in place by a removable band.

The novel features characteristic to this invention are set forth in the appended claims. Nevertheless, the invention, both as to its organization and how it works, together with additional advantages, is elaborated on in the following description of the specific embodiment when read in conjunction with the accompanying drawings.

DESCRIPTION OF THE PREFERRED EMBODIMENT

Figure 2:
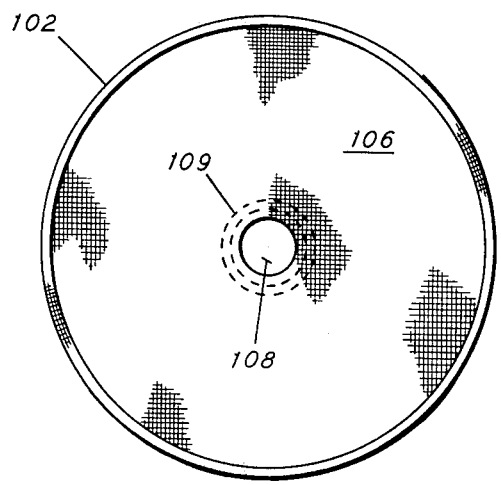
FIG. 2 is an end view of the present invention taken along section line 2—2 in FIG. 1.
Figure 1:
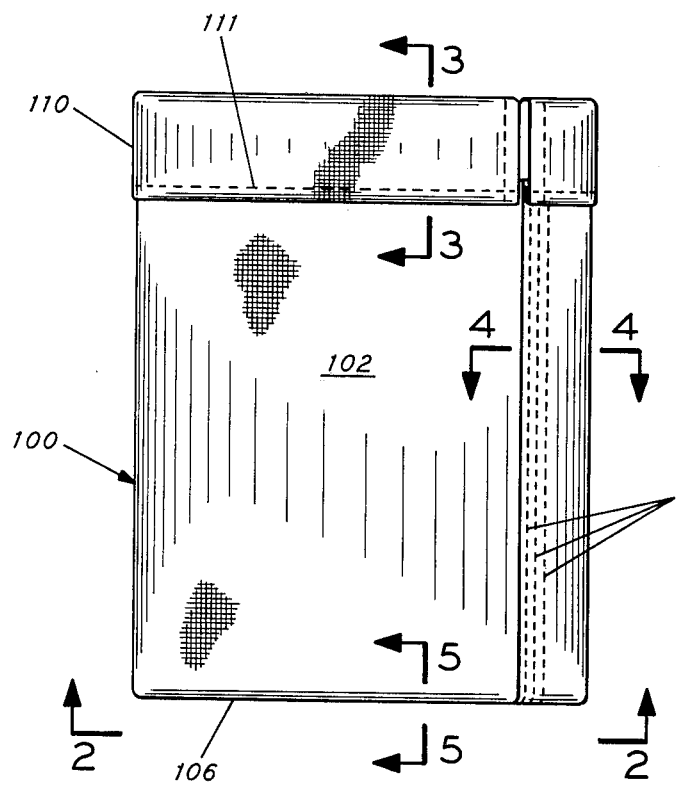
FIG. 1 is an elevational view of the flexible shielding means for a turbine housing cover.

FIGS. 1 and 2 illustrate a circular flexible housing cover or shielding means 100 that is mainly formed by stitching together two sections, 106 and 102. Sidewall 102 consists of a plurality of layers of aluminized or aluminum-coated ballistic nylon fabric which has a tensile strength of 430,000 psi, a modulus elasticity of $19 \times 10^6$ psi with a density of 0.053 pounds per cubic inch and elongation at break of 2.3%. One such material is Kevlar 49 produced by DuPont. The aluminum coating of the ballistic nylon may be provided to facilitate sewing the material or fabric with nylon thread, though non-coated ballastic nylon can be used.

Figure 3:
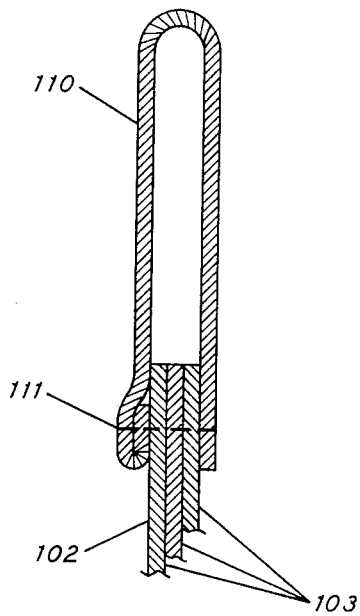
FIG. 3, which is a section taken in the direction of section line 3—3 in FIG. 1, illustrates a looped portion at the upper end of the shielding means of FIG. 1 for locating an adjustable band that secures the shielding means to a housing cover.
Figure 4:
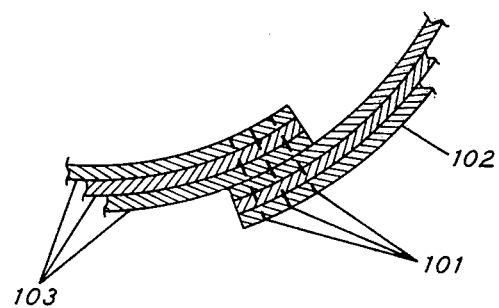
FIG. 4, which is taken in the direction of section line 4—4 in FIG. 1, illustates the manner the multiple layers of aluminized ballastic nylon are joined together to form a continuous sidewall.

The strong and flexible or fabric layers, 103, which form sidewall 102 (see FIGS. 3 and 4), are wrapped into a configuration that fits over the housing cover being shielded. For illustration purposes, a cylindrical configuration was chosen. These layers are connected by a plurality of seams 101, FIGS. 1 and 4, to form a given configuration. A "seam" as used here is the stitching used to join two or more layers of fabric by sewing. Specifically, I have found that a sewing machine such as Singer 111W155 lock stitch using a 24 size steel needle can adequately sew the layers of Kevlar together with nylon thread, size 24.

Figure 5:
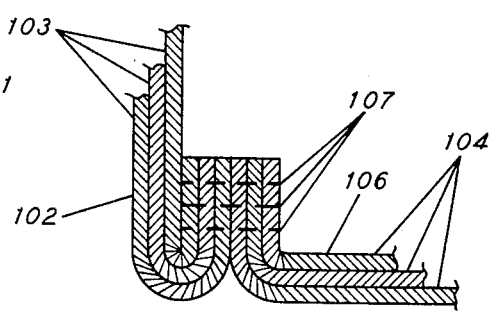
FIG. 5, taken in the direction of section line 5—5 in FIG. 1, illustrates the manner the closed end bottom is connected to the continuous sidewall.

Closed end 106, FIG. 2, which is perpendicular to the illustrated continuous cylindrical wall 102, is also formed of a plurality of strong and flexible layers 104 (FIG. 5) of ballistic nylon fabric described above. For example, these layers may be cut out using a revolving cutting knife in a circular pattern and stitched together and inserted over the open end of the cylindrical sidewall previously described. Subsequently, they are stiched to the cylindrical walls with nylon thread to form seam 107, FIG. 5.

In some cases it may be necessary for governor linkage or other similar operating mechanisms to pass through the closed end. In this case, hole 108, FIG. 2, is cut using a revolving cutting knife and then peripherally stitched, 109, so that fraying or other similar action will not occur.

The shielding means thus has an open end; a strong, flexible continuous but lightweight sidewall; and one similar flexible end wall forms the closed end. The open end fits over the housing cover and is securable or held in place by a removable means such as an adjustable metal band (not illustated) near the point of attachment of the housing cover of a turbine. A retaining slot 110, FIG. 3, formed by lapping the ballistic nylon material or fabric and stitching (111) it to the upper end of side 102 may be used to position the adjustable band around the cover.

The terms and expressions used in the preceding are terms of description and not of limitation; there is no intention in the use of the terms and expressions to exclude any equivalence of the features shown and described which are feasible within the scope of the following claims.

What is claimed is:

1. A removable lightweight shielding means of ballistic nylon to provide added protection to a turbine governor housing, comprising: a first plurality of layers of ballistic nylon fabric forming a continuous sidewall and a second plurality of ballistic nylon fabric layers fitted and secured around an open end of said continuous sidewall so as to form a closed end of said shielding means, said shielding means locatable over a turbine housing cover and securable to said housing by a removable means.

2. A removable lightweight shielding means as set forth in claim 1 wherein said second plurality of fabric layers fitted and secured around said continous sidewall has means for allowing operating mechanisms to pass through said second plurality of layers.

3. A removable lightweight shielding means as set forth in claim 1 wherein each of said first and second plurality of ballistic nylon fabric layers is coated with aluminum.

4. A removable lightweight shielding means as set forth in claim 1 wherein each of said first and second plurality of ballistic nylon fabric layers is coated with aluminum and has a tensile strength of approximately 430,000 psi, a modulus of elasticity of $10 \times 10^6$ psi and a elongation at break of 2.3%.

* * * * *